US008834750B1

(12) United States Patent
Glenn et al.

(10) Patent No.: US 8,834,750 B1
(45) Date of Patent: Sep. 16, 2014

(54) STARCH-BASED FIRE RETARDANT

(71) Applicant: The United States of America, as represented by the Secretary of Agriculture, Washington, DC (US)

(72) Inventors: Gregory M. Glenn, American Canyon, CA (US); Artur P Klamczynski, Orinda, CA (US); Gokhan Bingol, Istanbul (TR)

(73) Assignee: The United States of America, as represented by the Secretary of Agriculture, Washington, DC (US)

( * ) Notice: Subject to any disclaimer, the term of this patent is extended or adjusted under 35 U.S.C. 154(b) by 0 days.

(21) Appl. No.: 13/853,963

(22) Filed: Mar. 29, 2013

Related U.S. Application Data (60) Provisional application No. 61/621,444, filed on Apr. 6, 2012.

(51) Int. Cl.
  *C09K 21/14*    (2006.01)
  *C09K 21/02*    (2006.01)
  *A62D 1/00*     (2006.01)

(52) U.S. Cl.
  CPC ........................ *C09K 21/14* (2013.01)

USPC .......... 252/607; 252/610; 252/611; 252/603; 252/601; 252/8.05

(58) Field of Classification Search
  None
  See application file for complete search history.

(56) References Cited

U.S. PATENT DOCUMENTS

| | | | | |
|---|---|---|---|---|
| 1,624,398 | A * | 4/1927 | Dunlap et al. | 252/6.5 |
| 2,889,235 | A * | 6/1959 | Campbell et al. | 428/342 |
| 3,001,907 | A * | 9/1961 | Bergstrom | 162/175 |
| 3,409,550 | A * | 11/1968 | Gould | 252/602 |
| 3,945,962 | A * | 3/1976 | Clark | 524/99 |
| 5,338,349 | A * | 8/1994 | Farrar | 106/18.12 |
| 6,911,070 | B2 * | 6/2005 | Gang | 106/18.14 |
| 7,153,354 | B2 * | 12/2006 | Narayan et al. | 106/207.1 |
| 8,187,423 | B1 * | 5/2012 | Glenn et al. | 162/181.8 |
| 2006/0076531 | A1 * | 4/2006 | Hagguist et al. | 252/4 |
| 2006/0208236 | A1 * | 9/2006 | Gang | 252/601 |
| 2007/0034823 | A1 * | 2/2007 | Hagquist et al. | 252/2 |
| 2013/0269957 | A1 * | 10/2013 | Hagquist et al. | 169/46 |

* cited by examiner

*Primary Examiner* — Joseph D Anthony
(74) *Attorney, Agent, or Firm* — Elizabeth R. Sampson; John Fado; Lesley Shaw (57) ABSTRACT

In one aspect, the invention is directed to fire retardant compositions comprising clay and starch and uses thereof to protect structures and objects from fire and/or excessive heat.

5 Claims, 10 Drawing Sheets

STARCH-BASED FIRE RETARDANT

REFERENCE TO RELATED APPLICATIONS

This application claims priority to U.S. Provisional Patent Application 61/621,444, filed Apr. 6, 2012, which is incorporated herein by reference.

FIELD OF THE INVENTION

The invention relates to fire retardant compositions.

BACKGROUND OF THE INVENTION

Wild fires can be devastating to communities where high winds, low humidity, and high temperatures prevail. In populated regions of the U.S. that have extended periods of low rain and low humidity, such as e.g., California, wildfires are a perennial concern. Thousands of homes over the past several years had been consumed by wildfires in California e.g., the Oakland firestorm of 1991, the California wildfires of 1993, 2003, 2008 and the California firestorm of 2007. In fact, six of the twenty five most costly fires in U.S. history have been attributed to California wildfires. Property damage from these disasters alone totaled in excess of $7.4 billion (see e.g., J. B. Davis Journal of Forestry 88 (1990) 26-31; S. F. McDonald, et al., Environmental Toxicology and Chemistry 16 (1997) 1370-1376).

Due to its low cost and wide availability, water is the most widely used fire retardant/extinguisher. Unfortunately the use of water to provide fire protection is limited by the fact of its low viscosity which can e.g., lead to excessive run-off. Indeed, it is estimated that as much as 92% of the water used to extinguish a fire is simply lost due to runoff (see e,g., E. W. Figiel, et al., *Fire retardant foam and gel compositions*, National Starch and Chemical Investment Holding Corporation (New Castle, Del., US), United States, 2006).

To counter the problem of runoff associated with the use of water as a fire retardant, gelling agents such as e.g., sodium bentonite have been added to water in an attempt to increase viscosity and reduce runoff. Unfortunately, sodium bentonite does not adhere well to surfaces as it dries and thus with time, has a tendency to slump off structures or objects to which it is applied.

Thus, there is a need in the art for more effective means of preventing damage to building structures and/or other objects which are the result of fire or excessive heat.

Fortunately, the present invention provides for these and other needs.

SUMMARY OF THE INVENTION

It has now been discovered that a composition comprising starch and clay is effective as a fire retardant.

Thus, in one exemplary embodiment, the disclosure provides a composition effective as a fire retardant, wherein the composition comprises clay and starch. In one exemplary embodiment, Thus, in an exemplary embodiment, the disclosure provides a composition effective as a fire retardant, wherein the composition comprises water, clay and starch, wherein the clay to starch ratio is between about 10:1 to about 2:1, and wherein the water is present in an amount that is between about five (5) times to about twenty (20) times as much water as clay. In one exemplary embodiment, the clay is sodium bentonite clay. In another exemplary embodiment, the sodium bentonite clay is present in a 5:2 clay to starch weight ratio. In another exemplary embodiment, the clay to starch ratio is 5:2 and water is present in an amount that is 10 times as much water as clay.

In another exemplary embodiment, the disclosure provides a method for protecting a structure or object from fire or excessive heat, the method comprising: applying a fire retardant composition to the structure or object, wherein the fire retardant composition comprises clay and comprises water, clay and starch, and wherein the clay to starch ratio is between about 10:1 to about 2:1, and wherein the water is present in an amount that is between about five (5) times to about twenty (20) times as much water as clay.

Other features, objects and advantages of the invention will be apparent from the detailed description which follows.

DETAILED DESCRIPTION OF THE INVENTION

Definitions

Unless defined otherwise, all technical and scientific terms used herein generally have the same meaning as commonly understood by one of ordinary skill in the art to which this invention belongs.

The term "fire retardant" as used herein refers to a composition or substance that protects structures and objects to which it is applied from fire and/or excessive heat.

The expression "protects from fire and/or excessive heat" as used herein refers to the prevention, reduction, or elimination of damage caused to the structure or object by excessive heat or fire by comparison to an object or structure that is not protected e.g., protected by a fire retardant. Thus, the expression "effective as a fire retardant" as used herein, refers to the ability of a composition, when applied to an object or structure, to provide any indica of success in prevention, elimination, reduction or amelioration of damage caused to the structure or object caused by excessive heat or fire by comparison to an object or structure to which no fire retardant has been applied. In some exemplary embodiments the expression "protects from fire and/or excessive heat" refers to the ability of a composition to delay or prevent an object or structure from experiencing ignition due to the proximity of the structure or object to fire or excessive heat.

The expression "excessive heat" as used herein refers to heat flux sufficient to or exceeding that which is able to cause ignition of a structure or object. Typically the incident heat flux sufficient to ignite a wood structure or object is in a range that is between about 13 kW/m$^2$ to about 46 kW/m$^2$, but can be higher depending on the nature of a fire or heat source responsible for the ignition.

The term "clay" as used herein, refers to any type of aluminum silicate based material. Typically clay particles are less than 2 μm in diameter, and are distinguished from other small particles present in soils e.g., from silt, by their small size, flake or layered shape, affinity for water and high plasticity index. The three main groups of clays are kaolinite-serpentine, illite, and smectite. Some exemplary "clays" which fall into these groups include, but are not limited to, sodium bentonite, kaolin, montmorillonite, fuller's earth, calcium bentonite and attapulgite.

In an exemplary embodiment, "clay" is sodium bentonite clay. Bentonite clay is an absorbent aluminium phyllosilicate clay comprised largely of montmorillonite, $(Na,Ca)_{0.33}(Al,Mg)_2Si_4O_{10}(OH)_2 \cdot nH_2O$. In an exemplary embodiment, sodium bentonite clay is used with starch to prepare a coating material effective for protecting structures from fires. Thus, in an exemplary embodiment, a fire retardant material comprises sodium bentonite clay and starch.

The term "starch" as used herein refers to a carbohydrate compound having the formula $(C_6H_{10}O_5)_n$, where the subscript "n" denotes the total number of glucose monomer units. Typically, starches are comprised of the polysaccharides amylose and amylopectin. The amylose polysaccharide is comprised primarily of glucose monomer units joined to one another in α-1,4 linkages. Amylose is typically considered a linear molecule, however some minor branching sometimes is found. Typically, amylose polymers range in length from between about 500 to about 20,000 glucose monomer units, although any length is possible. Amylopectin is also comprised of glucose monomer units, but is not usually considered to be a strictly linear molecule. Instead, the polysaccharide comprises α-1,4 linked glucose monomers interspersed at intervals with branches formed by glucose monomers in α-1,6 linkage (see e.g., Advances in Food and Nutrition Research, Vol. 41: *Starch: Basic Science to Biotechnology*, Mirta Noemi Sivak and Jack Preiss eds. Academic Press (1998) which is incorporated herein by reference in its entirety).

The relative content of amylose and amylopectin in starch can vary. Typically, amylose comprises about 20% to about 25% to about 30% of the starch, but may be present in higher concentrations as well. For example "high-amylose corn starch" (HACS) comprises at least about 40% amylose, and in some embodiments comprises about 50%, about 55%, about 60%, about 65%, about 70%, about 75% amylose, and in other embodiments comprises about 80% amylose or about 85% amylose. Amylopectin on the other hand, typically comprises about 70% to about 75%, to about 80% of the starch, but may occur in higher proportions or lower proportions as well, e.g., waxy corn starch may comprise more than 99% amylopectin, and HACS may comprise as little as 15% amylopectin or less.

Starch is found in nearly every type of plant tissue including, but not limited to the fruit, seeds, stems, leaves, rhizomes and/or tubers. Thus, many starches are plant derived starches or "plant starch". Typically, starch produced in the USA is derived from corn, potatoes, rice, and wheat. However, useful starches can come from any source e.g., seaweed, arrowroot, guar gum, locust bean, tapioca, arracacha, buckwheat, banana, barley, cassava, konjac, kudzu, oca, sago, sorghum, sweet potato, taro, yams and beans e.g., favas, lentils and peas.

The term "starch" as used herein, can also refer to "modified starch" which has been modified by human intervention such that it differs from the raw, unmodified form as extracted from a plant. For example, starch can be modified by methods known in the art such as e.g., by chemical crosslinking and/or by stabilization through the introduction of anionic groups to the starch granule.

The term "foam" as used herein, refers to any substance comprising gas bubbles, typically in large proportion, trapped in a liquid or in a solid. In an exemplary embodiment, foam is comprised of starch. Hence in an exemplary embodiment, foam is a starch foam. In one exemplary embodiment, starch foam is a solid foam. As is known in the art, solid foam compositions can have an open celled structure, a closed celled or have a structure that is a mixture of closed and open cells (see e.g., Glenn, G. M., et al. (1996) Microcellular Starch-Based Foams. In: G. Fuller, T. A. McKeon, D. D. Bills (Eds.) Agricultural Materials as Renewable Resources. Pp. 88-106). Open cell structured foams comprise pores that are connected to each other such that the connections form an interconnected network of pores. Closed cell foams do not have interconnected pores.

The term "gel" as used herein, is as known in the art and refers to a non-fluid colloidal network or polymer network that is expanded throughout its whole volume by a fluid.

I. Introduction:

Wild fires can be devastating to wooded communities where high winds, low humidity, and high temperatures prevail. The term "wildland-urban interface" (WUI) was coined to describe urban development in private and public wildlands (see e.g., D. M. Theobald, and W. H. Romme, Landscape and Urban Planning 83 (2007) 340-354; J. B. Davis, Journal of Forestry 88 (1990) 26-31; A. Massada, V. C. Radeloff, S. I. Stewart, and T. J. Hawbaker, Forest Ecology and Management 258 (2009) 1990-1999). Approximately 89% of the WUI is located on privately owned land and an estimated 65% of the WUI resides in high fire risk areas (D. M. Theobald, and W. H. Romme supra). In populated regions of the U.S. that have extended periods of low rain and low humidity, such e.g., California, wildfires are a perennial concern in the WUI. Thousands of homes over the past several years have been consumed by wildfires in California and the U.S. in general.

Ignition of building structures can result from radiant heat, direct flame contact (conduction), a mixture of radiant and convective heat, or from firebrands or floating embers that can travel more than a kilometer away from a fire (see e.g., N. Sardoy, J.-L. Consalvi, B. Porterie, and A. C. Fernandez-Pello, Combustion and Flame 150 (2007) 151-169; J. L. Beverly, P. Bothwell, J. C. R. Conner, and E. P. K. Herd, International Journal of Wildland Fire 19 (2010) 299-313; M. Klassen, J. Sutula, M. Holton, and R. Roby, Transmission Through and Breakage of Single and Multi-Pane Glazing Due to Radiant Exposure: State of Research. Fire Technology 46 (2010) 821-832; F. Morandini, and X. Silvani, Experimental investigation of the physical mechanisms governing the spread of wildfires. International Journal of Wildland Fire 19 (2010) 570-5826). Even though structures may be built with fire resistant siding or roofing materials, ignition of curtains or other combustible materials can occur inside of a structure due to high radiant heat flux through windows. Furthermore, high heat flux can cause windows to shatter leaving the interior of a structure exposed and vulnerable.

Water remains the most widely used material for fighting fires because of its low cost and broad availability. Water extinguishes fire by lowering the temperature of a burning object below the ignition temperature and by decreasing the availability of oxygen (see e.g., R. D. Hicks, J. E. Mills, W.-N. Hsu, and R. A. Agne, Water additive and method for fire prevention and fire extinguishing. in: U.S.P. Office, (Ed.), Stockhausen GmbH & Co. KG (DE), 2001). Unfortunately, due to its fluid nature (low viscosity) as much as 92% of the water used to extinguish a fire is lost due to run-off (see e.g., J. Pascente, and T. Pascente, Method of preventing combustion by applying an aqueous superabsorbent polymer composition. in: U.S.P. Office, (Ed.), United States Patent Application Publication, United States, 1998).

Water applications can be made more effective is to decrease run-off by increasing viscosity (see e.g., A. G. Clem, and R. W. Doehler, Industrial applications of bentonite. in: A. Swineford, and P. C. Franks, (Eds.), Clays and Clay Minerals. Proceedings of the Tenth National Conference, Pergamon, London; Macmillan, New York, Austin, Tex., 1963, pp. 272-283). Adding gelling materials such as sodium bentonite (SB) clay to water increases its viscosity (reduces its fluidity). SB has been used to improve the effectiveness of water drops used to fight forest fires (see e.g., A. G. Clem, and R. W. Doehler supra). However, sodium bentonite clay does not adhere well after drying and accordingly loses its effectiveness.

Fortunately, the present inventors have discovered, and now herein disclose, a fire retardant composition comprising clay and starch which is effective for protecting structures and objects from fire and excessive heat. The composition inter alia overcomes the problem of excessive water associated with the use of water as a fire retardant and thus is effective for combating and controlling wildfires.

II. Overview of Components

Fire retardant compositions as disclosed herein comprise at minimum water, starch and clay. In some exemplary embodiments, foaming agents and other components are added to the mixtures of clay/water/starch to achieve the type of final product desired.

A. Starch

Starch is well known in the art. Starch typically comprises two glucose polymers known in the art as amylose and amylopectin. Amylose is an α(1,4)-linked glucose polymer which is essentially a linear chain without branching. Amylopectin is a branched glucose polymer. Typically, the branch chains are linked to the main chain α(1,4)-linked polymer, by α(1,6)-linkages. As is known in the art, the linear glucose polymers are synthesized by the action of starch synthases which produce the α(1,4)-linkages. The α (1,6)-linkages of amylopectin are produced by the action of branching enzymes.

Starch, in its raw state, is typically found in the form of dense granules that range in size from 2 microns in wheat starch, to over 100 microns in potato starch. Starch granules are highly organized, comprising of a series of concentric spheres consisting of alternating crystalline and amorphous regions (see e.g., Cameron and Donald (1992) Polymer 33:2628-2635).

In an exemplary embodiment, fire retardant compositions comprise plant starch. Most starch is use today is derived from plants. In plants, starch is synthesized by a series of enzymatic reactions (see e.g., Advances in Food and Nutrition Research, Vol. 41 supra; Martin and Smith (1995) Plant Cell. 7:971-985; Myers et al., (2000) Plant Physiol. 122: 989-997). Genes or cDNAs of most starch biosynthetic enzymes from corn, potato, barley, and wheat have been cloned, and the cloned genes have been used to over- or under-express starch biosynthetic enzymes (see e.g., Stark, D. M., et al., (1992) Science 258:287; and Flipse, E., et al., (1994) Theor. Appl. Genet. 88:369). Thus, in another exemplary embodiment, starch microcellular foam comprises starch from a transgenic plant that expresses one or more cloned starch biosynthetic genes.

Starch structures differ in different species. For example, barley and wheat amylopectins have larger portions of short branch chains (6 to 14 glucose units), have proportionally fewer branch chains of 11 to 22 glucose units and >40 glucose units, and larger proportions of branch linkages located within the crystalline region when compared to e.g., maize amylopectin (Jane et al., (1999) Cereal Chem. 76(5): 629-637; and Song and Jane, (2000) Carbohydrate Polymers. 41:365-377).

Similarly, the relative proportions of amylose and amylopectin differ in starches derived from different species. For example, amylose content of wheat starch is about 0% for waxy wheat cultivars and about 22-30% (about 29% on average) for normal (non-waxy) wheat cultivars. Some maize cultivars yield corn starch in which the amylose content is as high as about 60-70% or greater e.g., 75%, 80%, 85% amylose. Among various rice varieties, Indica rice grain has a higher amylose content than Japonica rice grain.

The amylose and amylopectin content of starch can be measured by methods known in the art. In exemplary embodiments, amylose content is measured by the colorimetric method disclosed by Kuroda et al. (Jpn. J. Breed. 39 (Suppl. 2):142-143, (1989)) and/or by amperometric titration (see e.g., Fukuba and Kainuma, (1977) "*Quantification of Amylose and Amylopectin*" in: Starch Science Handbook, Nakamura M. and Suzuki S., eds Tokyo: Asakura Shoten, pp 174-179). Starch concentration of solutions can be determined e.g., by the phenol-sulfuric acid method (Dubois et al., (1956) Anal. Chem. 28:350-356) with glucose as a standard.

As noted above, starch is found in nearly every type of plant tissue including, but not limited to the fruit, seeds, stems, leaves, rhizomes and/or tubers. Isolation of starch from plants may be achieved by methods known in the art. Exemplary methodology is disclosed in e.g., Advances in Food and Nutrition Research, Vol. 41 supra; *Starch Chemistry and Technology*, R. L. Whistler ed., Academic Press (1984); *Starch: Properties and Potential*, Galliard, T., ed., John Wiley and Sons (1987), each of which is incorporated herein by reference.

B. Clay

Clay is a generic term for an aggregate of hydrous silicate particles less than about 2 μm (micrometers) in diameter. As noted above, clay refers to any aluminum silicate based material. Typically clay comprises of a variety of phyllosilicate minerals rich in silicon and aluminium oxides and hydroxides with variable amounts of structural water. Typically clays are formed by the chemical weathering of silicate-bearing rocks by carbonic acid. However, some clays are formed by hydrothermal activity. In general, clays can be distinguished from other small particles present in soils e.g., silt, by their small size, flake or layered shape, affinity for water and high plasticity index.

The three main groups of clays are kaolinite-serpentine, illite, and smectite. There are about thirty different types of "pure" clays in these categories, but most "natural" clays are mixtures of these different types, as well as other weathered minerals.

Montmorillonite, with a chemical formula of $(Na,Ca)_{0.33}(Al,Mg)_2Si_4O_{10}(OH)_2 \cdot nH_2O$, is typically formed as a weathering product of low silica rocks. Montmorillonite is a member of the smectite group and a major component of bentonite. Bentonite is an absorbent aluminium phyllosilicate comprised largely of montmorillonite. Two types bentonite exist: swelling bentonite which is also called sodium bentonite and non-swelling bentonite or calcium bentonite.

In an exemplary embodiment, sodium bentonite clay is used in an aqueous fire retardant compositions as disclosed herein. Sodium bentonite clay is typically used in a 5:2 clay to starch weight ratio. However, the clay is may also be used at higher and/or lower bentonite to starch ratios e.g., in a range that is between about 10:1 to about 2:1.

C. Water

Typically the amount of water needed is in a range of about 10 times as much water as clay, but the ratio of water to clay may vary according to the needs of the practitioner. In some exemplary embodiments, the amount of water needed is in a range of about 10 times as much water as clay, the amount of water needed is in a range of about 5 times as much water as clay, about 15 times as much water as clay, about 20 times as much water as clay, etc.

The following examples are offered to illustrate, but not to limit the invention.

EXAMPLES

Example 1

The following Example illustrates the preparation and characterization of exemplary coating materials useful for inter alia, protecting structures from fires.

Pre-gelatinized waxy maize starch (Ultra-Sperse A) was purchased from National Starch and Chemical Company (Bridgewater, N.J.). Sodium bentonite powder (SB, Drill Mud 220, H-1-A) was purchased from Western Hydro Corporation (Hayward, Calif.). Exterior fiber cement lap siding (HardiPlank HZ5) 8 mm in thickness was purchased from a local building supply store. A sprayable gel coating designed for fire protection (ThermoGel) was purchased from Thermo Technologies (Bismark, N. Dak.) and used as a comparison with the SB foams and gels tested in the present study. A foaming surfactant (Versafoam Plus) was purchased from Cetco Drilling Products (Hoffman Estates, Ill.).

Sample Preparation

Sodium bentonite gel (SB Gel) was prepared by combining 50 g of SB powder to 500 g of water in a Waring blender. The ingredients were blended for 5 min to achieve adequate hydration and dispersion. SB gel samples containing starch (SB Gel+S) were made by first dry mixing 20 g of starch powder with 50 g of SB powder. The mixture was combined with 500 g water in a Waring blender and blended for 5 min. SB foam (SB Foam) and SB foam with starch (SB Foam+S) were prepared by first making SB Gel and SB Gel+S as previously described. The gels were transferred to two separate mixing bowls and 5.5 g of foaming surfactant was added to each bowl. The materials were mixed on medium speed for 5 min in a paddle mixer (Hobart) to produce a foam product. In addition to the SB samples, a commercial (ThermoGel) fire suppressant gel coating was prepared by adding 25 g of liquid concentrate to a mixing bowl with 500 g water and mixed for 5 min in a paddle mixer. The sample proportions and moisture content are detailed in Table 1. All gel and foam samples were used immediately for testing purposes.

TABLE 1

Proportion of ingredients by weight used in making fire retardant coatings of sodium bentonite (SB) foam and gels with (+S) and without starch and a commercial gel product.

| | Water (%) | SB (%) | Foaming Agent (%) | Starch (%) | Commercial Gel (%) |
|---|---|---|---|---|---|
| SB-Foam | 90.01 | 9.00 | 0.99 | 0.00 | 0.00 |
| SB Foam + S | 88.03 | 8.80 | 0.97 | 2.20 | 0.00 |
| SB-Gel | 90.91 | 9.09 | 0.00 | 0.00 | 0.00 |
| SB-Gel + S | 87.72 | 8.77 | 0.00 | 3.51 | 0.00 |
| Commercial Gel | 95.24 | 0.00 | 0.00 | 0.00 | 4.76 |

Mechanical Properties

Mechanical properties of the coatings influence the strength and stability of the coatings and the ability of the coatings to adhere to vertical surfaces such as e.g., walls and windows without slumping when exposed to intense heat.

The mechanical properties of the hydrated gel and foam samples were determined using both a penetrometer test as well as rheometry. For penetrometer tests, samples were prepared and transferred to round aluminum sample dishes (50× 20 mm, diameter and depth, respectively). Penetrometer tests were performed by pressing a flat-faced cylindrical probe (8 mm dia.) into the gel sample to a depth of 3 mm at a rate of 5 mm/min using a universal testing machine (model 4500, Instron Corp., Canton, Mass.). A load cell (100 N) was used to detect compressive force. Peak force, modulus, and toughness were determined from force/deformation data. Five samples were tested for each sample. The rheological properties of the samples were determined by using a TA Instruments (New Castle, Del.) AR2000 rheometer. Each sample was placed between a 20 mm diameter top plate and a Peltier plate. Sandpaper (220 grit, 3M, St. Paul, Minn.) was glued on both plates before introduction of sample to prevent wall slip (see e.g., H. J. Walls, et al. Journal of Rheology 47 (2003) 847-868). The sample thickness was held constant at 1 mm. A thin layer of silicone oil (Sigma-Aldrich, St. Louis, Mo.) was applied to the outer edge of the sample to minimize moisture loss (see e.g., M. C. Yang, et al. Journal of Rheology 30 (1986) 1015-1029). Dynamic strain sweeps were performed for each sample at a frequency of 1 rad/s and all experiments were performed at room temperature (23° C.). Before the start of each experiment, the sample was maintained at 23° C. for 10 min to allow for equilibration. The yield stress of a sample was determined by the maximum in a plot of $G'\gamma$ as a function of strain % (see e.g., H. J. Walls, et al. supra; M. C. Yang, et al. supra; M. Castro, et al. Journal of Rheology 54 (2010) 81-94). The elastic or storage modulus ($G'$) and the viscous modulus ($G''$) of the samples were recorded. The $G'$ measures the solid-like response of the material and the $G''$ measures the liquid response. Three replicates were performed for each sample.

As shown below in Table 2, density of the coatings was similar whether they were made from the commercial gel or from SB. The SB Gel was nearly three times the density of SB Foam. Adding starch did not affect the density of the gel but it doubled the density of the foam due to its effect on the foaming process. The SB Gel, SB Gel+S, and SB Foam+S had higher compressive strength than the SB Foam and the commercial gel.

TABLE 2

Density, compressive strength, and yield stress of sodium bentonite (SB) foam and gel samples with (+S) and without starch and commercial gel. Standard deviation is included in data for compressive stress and yield.

| Sample | Density ($kg/m^3$) | Comp. Stress (Pa) | Yield Stress σ (Pa) |
|---|---|---|---|
| SB Foam | 370 | 0.26 ± 0.03 | 235 ± 6 |
| SB Foam + S | 730 | 1.35 ± 0.07 | 403 ± 38 |
| SB Gel | 1,070 | 1.5 ± 0.2 | 400 ± 15 |
| SB Gel + S | 1,070 | 1.3 ± 0.1 | 633 ± 30 |
| Commercial Gel | 1,080 | 0.24 ± 0.05 | 66 ± 1 |

Figure 2A:
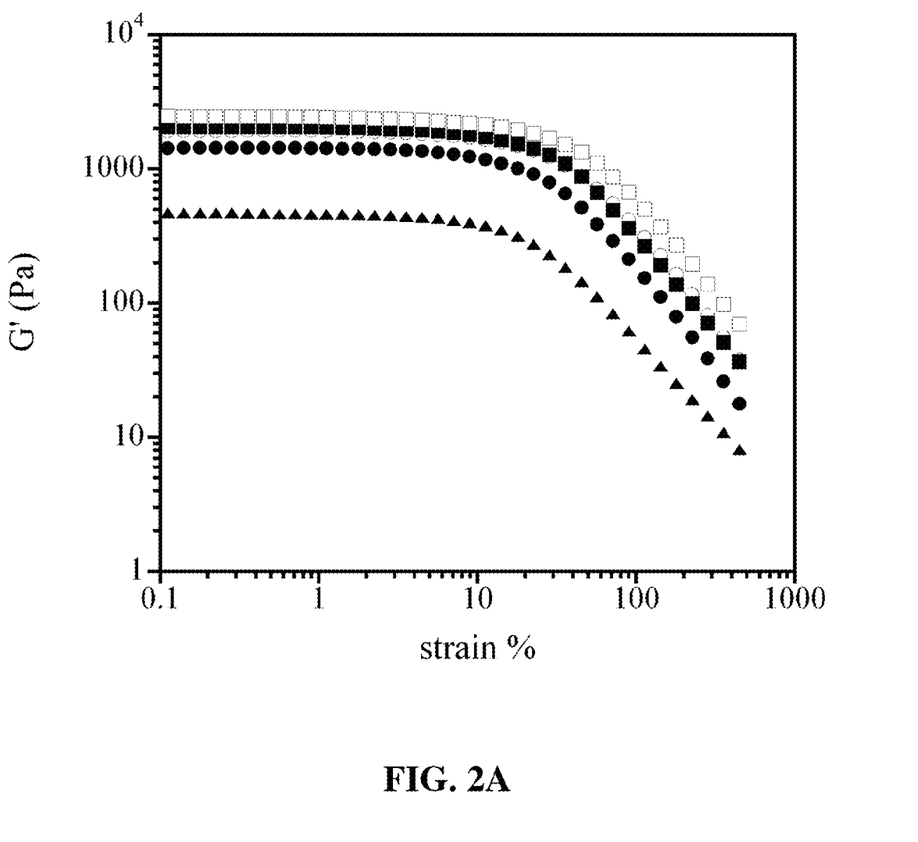
FIG. 2A Measured G' (elastic modulus) as a function of percent strain. The samples included SB foam (●), SB foam+S (+starch) (○), SB Gel (■), SB Gel+S (+starch) (□), and a commercial gel (▲).
Figure 2B:
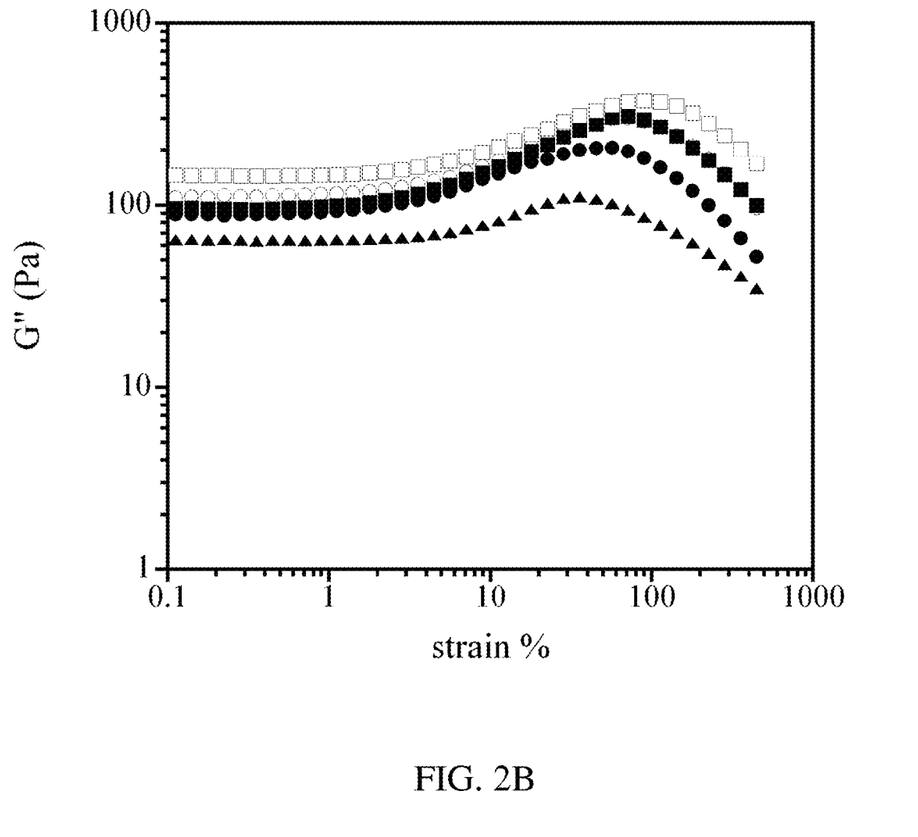
FIG. 2B. Measured G" (viscous modulus) as a function of percent strain. The samples included SB foam (●), SB foam+S (+starch) (○), SB Gel (■), SB Gel+S (+starch) (□), and a commercial gel (▲).

As can be seen e.g., in FIG. 2, at low strains in the linear viscoelastic region, where G' (elastic modulus) is independent of strain %, the SB G+S sample had the highest G' values, whereas the commercial gel had the lowest G' values (FIG. 2A). Also, the SB Gel+S sample had a larger difference between its G' and G" (viscous modulus) values than the commercial gel sample (FIG. 2B). These results indicated the SB Gel+S sample was more solid-like than the commercial gel. Also, the addition of starch increased the modulus values of both SB gel and foam (FIG. 2A). Without being bound by theory, it is believed that this was likely due to gelatinized starch forming interactions, such as e.g., hydrogen bonding, with SB thereby resulting in a more solid-like material. Indeed, the SB Foam+S sample had comparable dynamic modulus values to the SB Gel sample, even though both samples had very different structures. At higher strains, G' began to decrease in value. Again, without being bound by theory it is believed that this effect is probably due to disruption of interactions between the different components (FIG. 2A).

Figure 3:
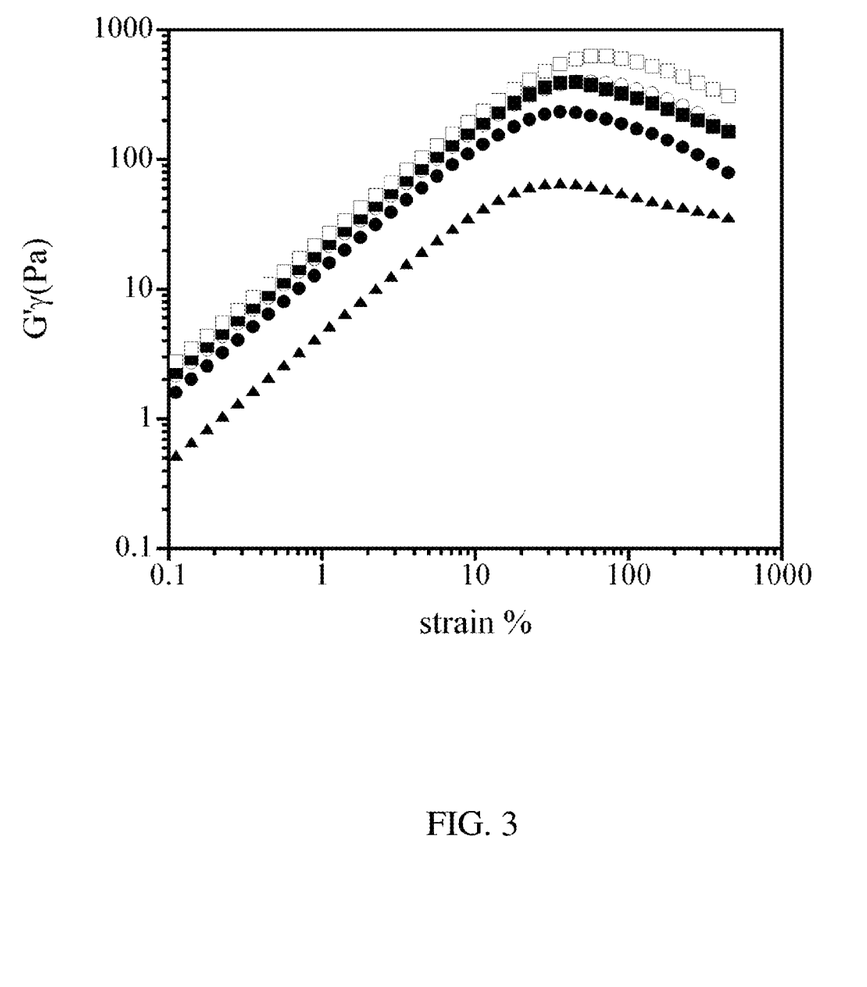
FIG. 3. G'γ as a function of γ % plot, where γ=strain. The samples included SB foam (●), SB foam+S (+starch) (○), SB Gel (■), SB Gel+S (+starch) (□), and a commercial gel (▲).

The SB Gel+S sample had the largest yield stress, which was almost an order of magnitude greater than that of the commercial gel. The yield stress (see e.g., M. Castro, D. W. Giles, C. W. Macosko, and T. Moaddel, Comparison of methods to measure yield stress of soft solids. Journal of Rheology 54 (2010) 81-94) of each sample can be determined by the maximum in a plot of G'γ as a function of strain % as shown in FIG. 3. The yield stress values for all samples are listed in Table 2 (above). The foam made from each material had lower yield stress than their gel counterparts. However, adding starch to the SB Foam resulted in a sample with comparable yield stress to the SB Gel sample. These comparable yield stress values are consistent with the comparable dynamic modulus values determined for both samples (see e.g., FIG. 2A-B). In an exemplary embodiment, yield stress values are used to determine how much material can be applied to a surface before the material slumps or yields due to gravity. More material can be applied to a surface without slumping if it has a higher yield stress. Thus, yield stress is one criterion in determining the overall performance of fire retardant materials.

Thermogravimetric Analysis (TGA)

Thermogravimetric analysis (Model 2950, TA Instruments, New Castle, Del.) was performed by methods known in the art (see e.g., N. Seetapan, N. Limparyoon, and S. Kiatkamjornwong, Polymer Degradation and Stability 96 (2011) 1927-1933; J. Gu, G. Zhang, S. Dong, Q. Zhang, and J. Kong, Surface and Coatings Technology 201 (2007) 7835-7841; B. Gardelle, S. Duquesne, C. Vu, and S. Bourbigot, Thermochimica Acta 519 (2011) 28-37). In short, samples were weighed (10 mg), equilibrated for 1 min at 20° C., then heated at a rate of 10° C./min up to 800° C. No buoyancy correction was used in the weight measurements. The TGA tests were performed both in air and in nitrogen (N2) using a flow rate of 20 $cm^3$/min. A calcium oxylate monohydrate standard was run to verify that the temperature calibration was within manufacturer specifications. The percent weight change as a function of temperature was monitored for each sample. All tests were performed in duplicate.

Figure 4:
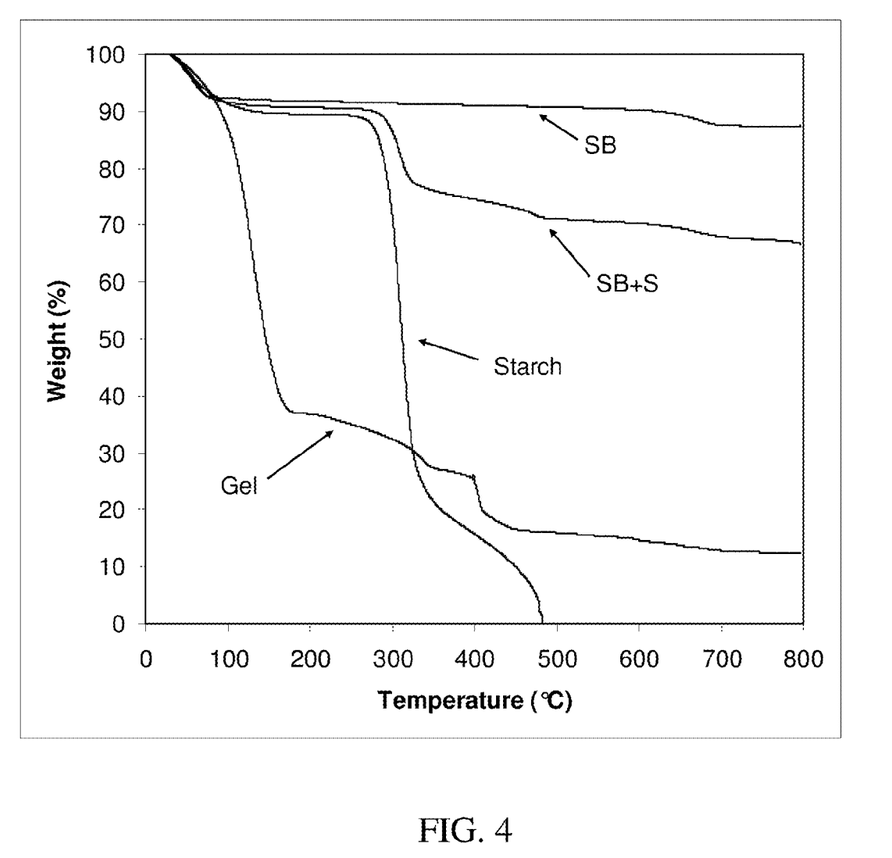
FIG. 4. Thermal gravimetric analysis "in air" of sodium bentonite (SB), SB with starch (SB+S), starch, and undiluted commercial gel material (Gel).

TGA was important to determine the stability of the coating materials at elevated temperatures. Data for samples tested in air are shown in FIG. 4 and were similar to samples tested in nitrogen (N2). The sodium bentonite (SB) showed only a slight weight loss when exposed to temperatures up to 800° C. (FIG. 4). The weight loss was most likely due to moisture loss. The starch component also had some initial weight loss due to moisture volatilization but lost most of its mass in the range of 300° C. with an additional 20% weight loss occurring in the range of 300-500° C. (FIG. 4). The TGA profile for the SB and starch blend is consistent with the starch and SB proportions listed in table 1. The TGA profile showed that the commercial gel was less thermally stable than gels of SB and starch. About 60% of the weight of the undiluted liquid was lost in the range of 0-150° C. (FIG. 4). An additional 20% of the weight was lost in the range of 150-400° C. The commercial gel is a proprietary formulation containing super-absorbent polymers such as polyacrylamide (see e.g., R. D. S. Hicks, N.C.), Mills, Jane Elisabeth (Greensboro, N.C.), Hsu, Whei-neen (Greensboro, N.C.), Water additive and method for fire prevention and fire extinguishing, Stockhausen, Inc. (Greensboro, N.C.), United States, 1999). In general, there are concerns in handling polyacrylamide because of the presence of small amounts of unreacted acrylamide monomer which is a cumulative neurotoxin and a carcinogen (see e.g., J. M. Rice, Mutation Research/Genetic Toxicology and Environmental Mutagenesis 580 (2005) 3-20). There may also be concerns with the byproducts of thermal degradation (see e.g., J. D. Van Dyke, and K. L. Kasperski, Journal of Polymer Science Part A: Polymer Chemistry 31 (1993) 1807-1823).

Example 2

The following Example illustrates the ability of the coating materials, prepared and tested as disclosed in Example 1, to protect a sample of commercial lap siding from intense heat (e.g. about 42 $kW/m^2$).

Burn Test

Burn tests used in the present study produced heat flux values (42 $kW/m^2$) within the range known in the art to ignite wood and is in the range that a structure would encounter near an intense wildfire (see e.g., J. D. Cohen, Canadian Journal of Forest Research 34 (2004) 1616-1626).

Materials and Methods for Example 2

Lap siding samples were cut into squares (200×200 mm) and holes for inserting thermocouples were drilled in four locations. The siding was placed in a holder on a table and gel or foam samples were applied to the siding with a spatula. Uniform thickness (8 mm) was attained by using spacers and a straight edge. Four thermocouples (type K, Model SC-GG-K-30-36, Omega Engineering, Stamford, Conn.) were inserted from the back of the siding and positioned flush with the surface of the siding and beneath the gel or foam coating. Set screws were used to secure each thermocouple in place during burn tests. The four thermocouples were positioned at each corner of a 105 mm square centered with respect to the lap siding samples. The thermocouples were attached to a data logger (Model HH309A, Omega Engineering, Stamford, Conn.) that recorded temperature over time. The loaded siding was then mounted in the burn test apparatus (FIG. 1).

The heat source in the burn test apparatus was comprised of an electric (240V/4500 W) ceramic infrared heating element (Tempco Electric Heater Corporation, Wood Dale, Ill.). The sample holder was mounted on a retractable base so that it could be drawn near to the surface of the infrared heating element. The infrared heat source was turned on at least 30 min before tests were to be performed to ensure the heating element had equilibrated. The average temperature of the infrared heat source was measured with an infrared heat gauge (514° C.±12 (Std dev)). The heating element was comprised of three individual ceramic elements positioned side-by-side giving a total heating surface area of 0.0837 $m^2$. The heating element operated only in on/off mode. Wattage and amperage measurements were taken at two different times to record variability in the readings. The heat flux at the heater surface was 42±0.4 (Std dev) $kW/m^2$ and the heat flux at the sample surface was assumed to be the same as at the heater surface.

Figure 1:
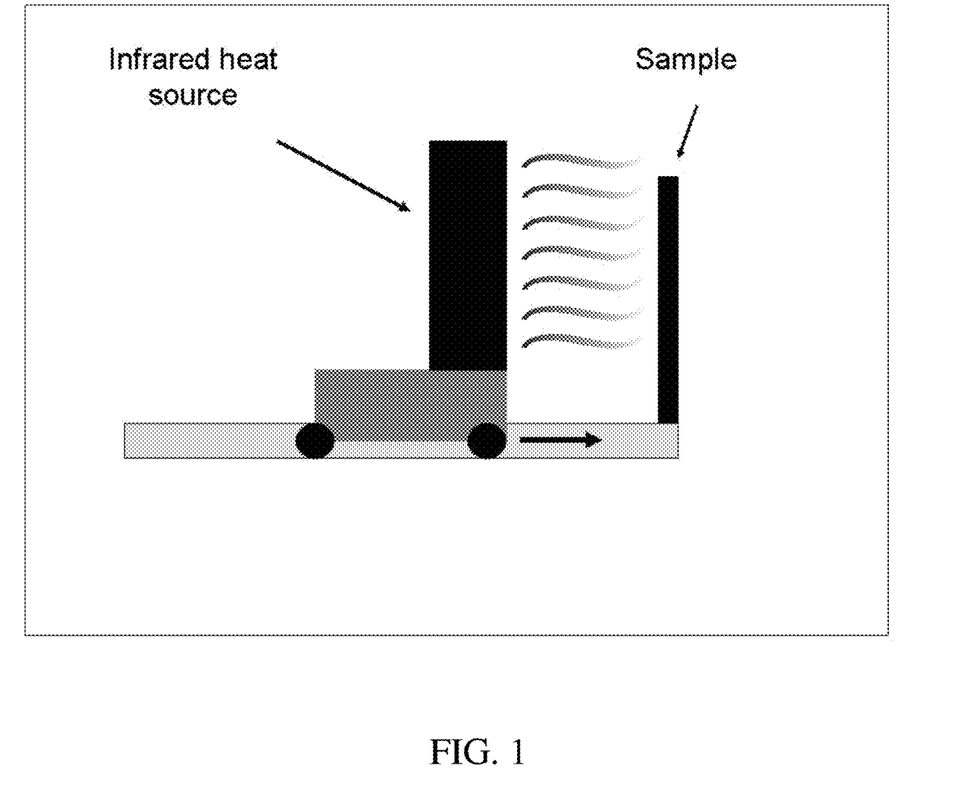
FIG. 1. Apparatus used to conduct burn tests. The sample holder is rolled into close proximity to the heat element (40 mm) to initiate a burn test.

Burn tests were initiated by moving the sample holder into close proximity (40 mm) to the surface of the infrared heater (see e.g., FIG. 1). Precautions were taken to minimize the heat loss between the heater and sample surfaces by maintaining the heater and sample surfaces in close proximity throughout the test and by placing an aluminum shroud over the assembly to help reflect heat back toward the sample. The initial thermocouple readings were similar (23° C.±0.90 (Std dev.)) for each of the four thermocouples at the beginning of the burn test. However, as the sample temperature increased, there was some variation among the four thermocouples. The variation was probably due partly to sample heterogeneity caused by the heat flux. For instance, small air voids that affect heat conduction may develop at or near the thermocouple tip due to steam generation inside the coating material. In addition, there can be some heterogeneity in the heat flux at the surface of the heater that can result in a thermocouple having consistently higher or lower readings throughout a burn test. Such was the case in the present investigation as one thermocouple consistently read higher than the others during burn tests. Nevertheless, thermocouple readings were still comparable among the four thermocouples throughout the burn test. The data were recorded until the temperature of any of the four thermocouples reached 200° C. The standard deviation among thermocouple readings at 200° C. was ±16° C.

A. Initial Burn Test

Figure 5:
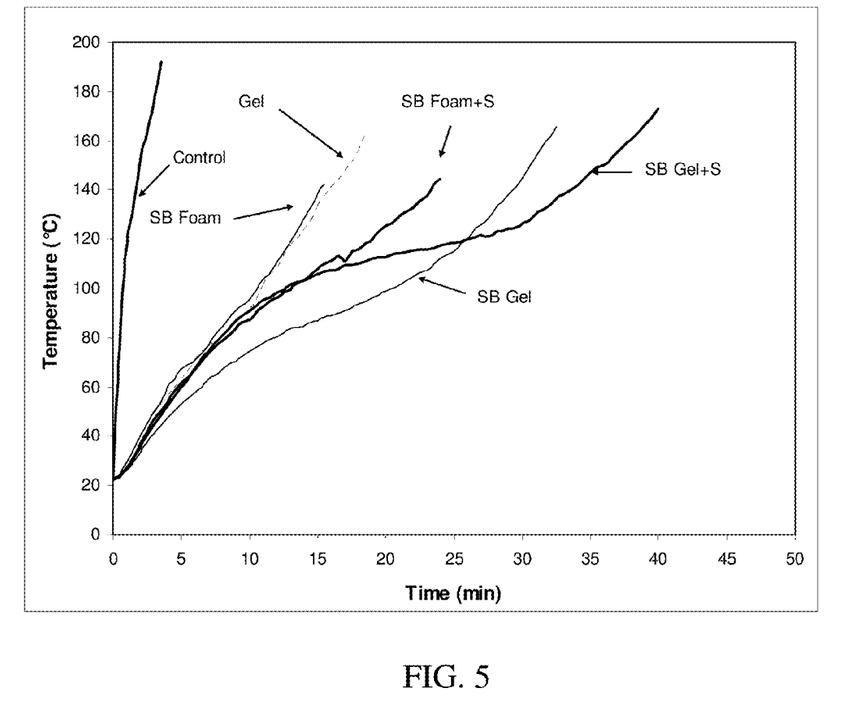
FIG. 5. Temperature of panel surface during burn tests of either uncoated (control) or panels coated with sodium bentonite (SB) foam (SB Foam), SB foam with starch (SB Foam+S), SB Gel, SB gel with starch (SB Gel+S), and a commercial fire protective gel (Gel).

The burn tests provided a means of evaluating the effectiveness of different coatings in suppressing the rise in temperature at the surface of the sample. The uncoated lap siding sample (control), which was comprised of a fiber-reinforced cement composite, reached 192° C. in 3.5 min (FIG. 5). Smoke was readily visible in samples as the surface temperatures approached 200° C. The smoke was not likely from the cement component since cement is relatively stable at those temperatures (see e.g., L. Alarcon-Ruiz, G. Platret, E. Massieu, and A. Ehrlacher, Cement and Concrete Research 35 (2005) 609-613). Some of the smoke could have been from the cellulose pulp fiber which was a minor component (ca. 8%) of the lap siding. While cellulose can withstand temperatures higher than 250° C. (see e.g., M. E. Calahorra, M. Cortázar, J. I. Eguiazábal, and G. M. Guzmán, Journal of Applied Polymer Science 37 (1989) 3305-3314) some lignins may have been present in the pulp that could have oxidized. Most of the smoke, however, was probably from the pyrolysis of the surface primer. This conclusion was supported by the observation that the primer color changed from yellow to a burnt orange hue during the test.

For samples containing the fire retardant coating, the water content of the coating material played an important role in determining the rate of temperature increase primarily because of its high specific heat (4.18 J/g° C.) and latent heat of vaporization (2260 J/g). The difference in the initial slope of the temperature curves for the control and the coated samples (FIG. 5) is attributable to the energy absorbed in heating the coatings and the energy absorbed by evaporative cooling at the coating surface exposed to the heat source.

The behavior of water in a fire coating exposed to heat is complex and is affected by the composition of the solids used to make the coating. In general, as the coating is exposed to heat, the temperature increases and the rate of water evaporation, and evaporative cooling, increases at the surface of the coating (see e.g., A. Z. Sahin, and I. Dincer, International Journal of Heat and Mass Transfer 45 (2002) 3267-3273). The increase in water vapor flux drives moisture within the coating towards the evaporative surfaces and is seen graphically as a decrease in the slope of the temperature/time curve of coated samples compared to the control sample with no coating (FIG. 5).

Figure 6:
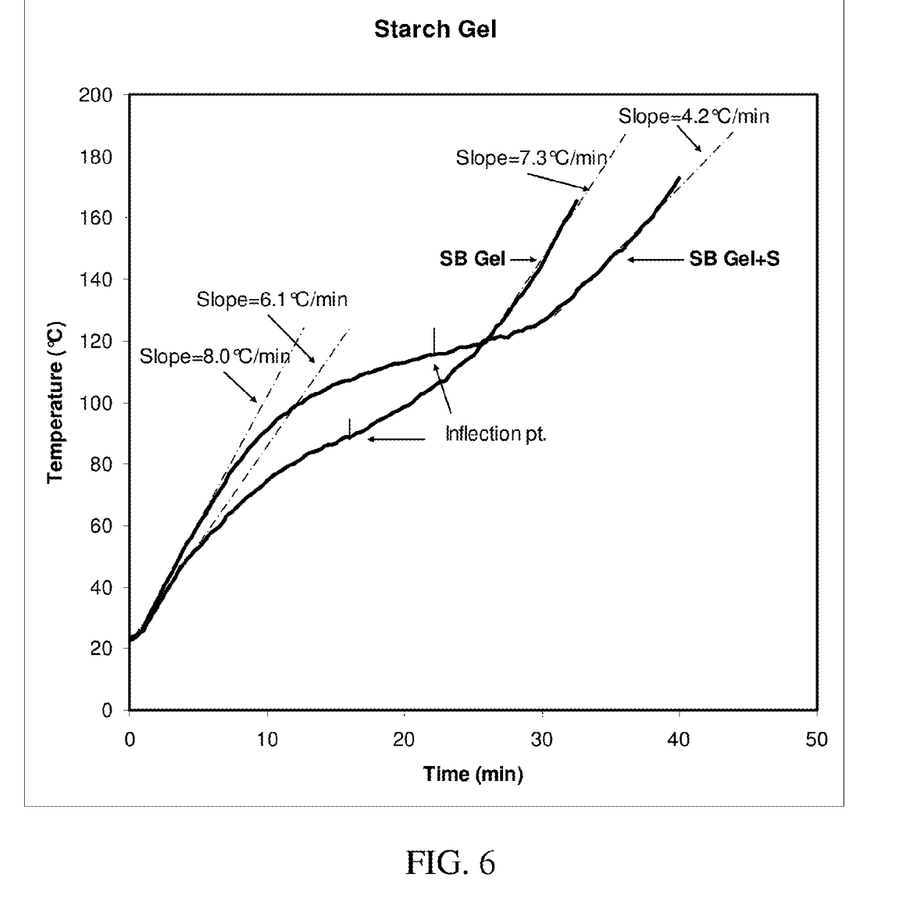
FIG. 6. Temperature/time curve for sodium bentonite gel coatings with starch (SB Gel+S) and without starch (SB Gel). The inflection point of each curve and the slope in the range of 22° C.-60° C. and 130° C.-160° C. were included (R2>0.99 for all slopes).

The effect of starch on the SB coating is well illustrated in the burn test profiles of SB Gel and SB Gel+S (FIG. 6). The slope of each curve was calculated at two intervals (22° C.-60° C. and 130° C.-160° C. (R2>0.99 for all slopes). The inflection point of each curve was determined from the second derivative of curve values. The slope of the curves near the region of the inflection points was estimated from curve values near the inflection points (±2 min).

The rate of temperature increase due to the incident heat flux at the sample surface was different for the SB Gel and the SB Gel+S samples. The lower initial slope of the SB Gel sample may be explained by a higher water vapor flux and greater evaporative cooling at the sample surface. During the burn test, the SB Gel sample probably formed a crust or boundary layer as water quickly evaporated on the coating surface. However, since SB tends to shrink and crack as it dries (FIG. 7B), it is likely that deep fissures formed in the crust exposing even more surface area to direct heat and further accelerating the rate of water evaporation. Consequently, the water in the SB Gel coating volatilized relatively quickly and at lower temperatures resulting in lower temperature/time values initially but accelerated values once the moisture content was depleted (FIG. 6).

The addition of starch to the SB Gel (SB Gel+S) resulted in higher initial temperature/time values (greater initial slope) compared to the SB Gel (FIG. 6). The most likely explanation for this result is that the SB Gel+S coating initially had a lower water vapor flux compared to the SB Gel coating. The starch component of the SB Gel+S coating has film forming properties that helped to form a continuous surface boundary layer or crust that was devoid of cracks and fissures (FIG. 7D). The continuous layer most likely helped insulate the underlying gel from direct exposure to the intense heat, minimized the exposed surface area, and maintained a higher underlying water vapor concentration that decreased the rate of water migration to the coating surface (A. Z. Sahin, and I. Dincer supra). The migration of moisture to the evaporative surface may also have been deterred by the higher viscosity of the SB Gel+S coating matrix as noted earlier (higher G" values FIG. 2B).

The samples coated with SB Gel+S had to be heated to a higher temperature (higher energy requirement) to achieve a high water vapor flux. This was evident by the inflection point in the temperature/time curve for SB Gel+S which occurred at a higher temperature than in the SB Gel sample (FIG. 6). The slope of the temperature/time curve in the region of the inflection point was lower for the SB Gel+S sample compared to the SB Gel sample (1.1° C./min versus 2.1° C./min, respectively) which is consistent with a greater water vapor flux in the SB Gel+S sample near the region of the inflection point.

The inflection point in the SB Gel+S curve occurred well beyond the normal boiling point of water. This may have been due in part to the continuous crust or barrier that formed on the surface of the coating exposed to the heat source. However, the viscosity of the coating matrix most likely plays an even more important role by affecting the movement of water to the coating surface. Starch typically increases in viscosity when heated in water (see e.g., W. Hu, A. Jiang, L. Jin, C. Liu, M. Tian, and Y. Wang, Journal of the Science of Food and Agriculture 91 (2011) 1499-1504). An increase in the viscosity of the coating matrix would slowdown or deter the movement of water to the evaporative surface of the coating matrix. The viscosity of the coating matrix would increase further as the moisture content decreased during the burn tests until the coating matrix solidified and physically entrapped some portion of water or water vapor. Additionally, starch is a hydroscopic polymer that binds water by strong hydrogen bonds (see e.g., L. Godbillot, P. Dole, C. Joly, B. Rogac, and M. Mathlouthi, Analysis of water binding in starch plasticized films. Food Chemistry 96 (2006) 380-386). The heat of vaporization of sorbed water can reach values higher than the heat of vaporization of pure water [38]. Higher temperatures would be necessary to remove all of the water bound to the surface of starch polymer. All of these factors combined would explain why the inflection point was beyond the normal boiling point of water for the SB Gel+S sample but not the SB Gel sample.

The slope of the temperature/time curve for the SB Gel+S sample increased gradually after the inflection point as the moisture content became depleted (FIG. 6). However, the slope of the SB Gel+S curve remained lower compared to the SB Gel sample curve in the temperature range tested (FIG. 6). This may have been due to the char residue that completely covered the sample surface and provided a barrier that shielded the SB Gel+S sample from direct exposure to the heat source (FIG. 7D). In contrast, the SB Gel sample did not have a continuous char residue protecting its surface and had a higher rate of temperature increase after reaching its inflection point (FIG. 6, 7B).

Visual observation of the samples following the burn test revealed that the SB foam and commercial gel samples were not stable under the experimental conditions (FIG. 7). In both cases, the samples slumped vertically during the burn test and left much of the underlying siding partially or completely exposed to the heat. This would explain why both samples had similar burn profiles (FIG. 5). The residual material from both samples provided some initial protection compared to the control but the temperature suppression from both coatings was much lower compared to the other samples (FIG. 5).

Figure 7A:
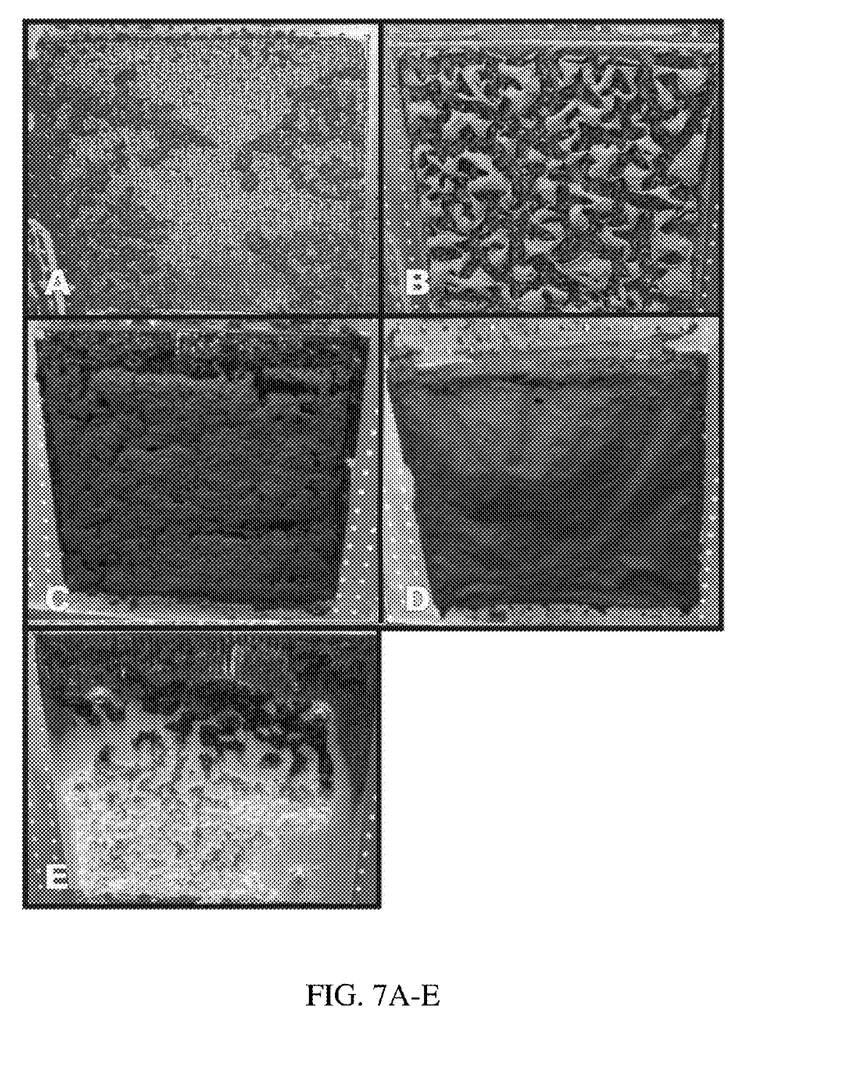
FIG. 7. Photographs of panels (200×200 mm) coated with sodium bentonite (SB) foam (A), SB gel (B), SB foam containing starch (C), SB gel containing starch (D), and a commercial fire retardant gel (E).

Adding starch to the SB foam markedly changed its properties. The starch reduced the foaming properties of the gel such that the final density was twice that of the foam sample without starch (Table 2). The starch improved the adhesion of the sample to the substrate as was evident by the amount of foam that remained adhered to the substrate throughout the entire burn test compared with the foam without starch (FIGS. 7A and 7C). Very little slump was observed in the SB foam with starch. The charred residue remaining after the burn test adhered well to the substrate (FIG. 7C) and, although devoid of water, provided secondary protection by shielding the substrate from direct and intense heat exposure.

B. Drying Test 2.2.4. Drying test. The drying characteristics of the gels and foams were of interest since fire suppressant coatings may dry considerably before an approaching fire arrives. A coating (8 mm) was applied on poly(methyl methacrylate) panels (160×160 mm) to evaluate the drying characteristics of the gels and foams. The panels were placed in an oven (44° C.) and weighed at regular intervals to monitor the rate of evaporation.

Figure 8:
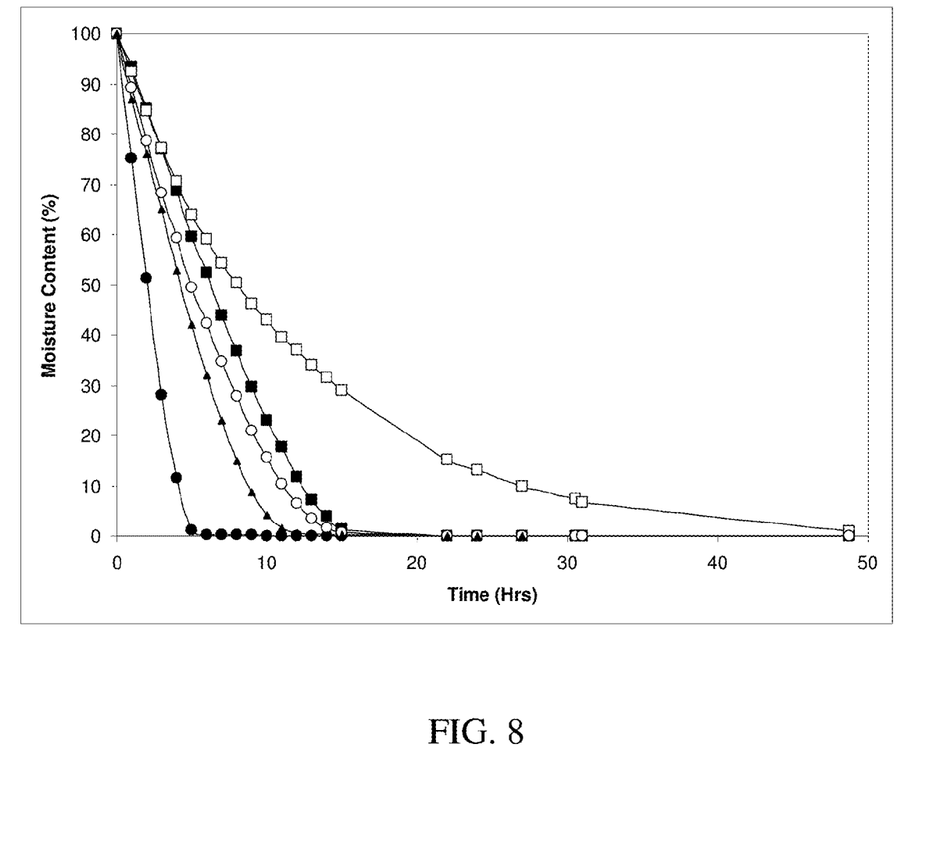
FIG. 8. Changes over time in moisture content of samples incubated in an oven at 44° C. The samples included sodium bentonite (SB) gel with starch (□) or without (■), SB foam with starch (○) or without starch (●), and a commercial gel made of superabsorbent polymer (▲).

A drying test was performed with the coatings to see how quickly they would lose moisture in a hot environment since the coatings would most likely be applied several hours in advance of an approaching fire. As expected, The SB Foam sample dried faster than the SB Gel which had a much higher total moisture content (FIG. 8). The commercial gel sample dried slightly faster than the SB gel which was somewhat unexpected since the commercial gel had a higher moisture content (Table 1). The difference in drying time could be explained by the fact that the commercial gel tended to slump, even on horizontal surfaces. Slumping reduced the final thickness of the coating by about 1 mm and consequently reduced the amount of gel applied to the substrate.

Including starch in the coating formulation markedly slowed the drying time of both the SB Foam and SB Gel (FIG. 8). The longer drying time for SB Foam with starch was expected since the starch tended to increase the density (Table 2) and, as a result, the total water content of the foam coating. This was not the case with the SB Gel coatings where the density of coating with or without starch was similar (Table 2). The SB Gel+S formed a continuous film or crust on the gel surface that restricted the rate of water loss and considerably lengthened the drying time (FIG. 8).

Six Hour Burn Test.

The effectiveness of the coatings after a six hour drying pre-step was investigated to simulate a reasonable amount of delay before an approaching fire arrives. The samples were prepared by applying a coating (8 mm) on panels of lap siding as described previously and then placing the samples in an oven at 44° C. for six hours before performing the burn test.

Figure 9:
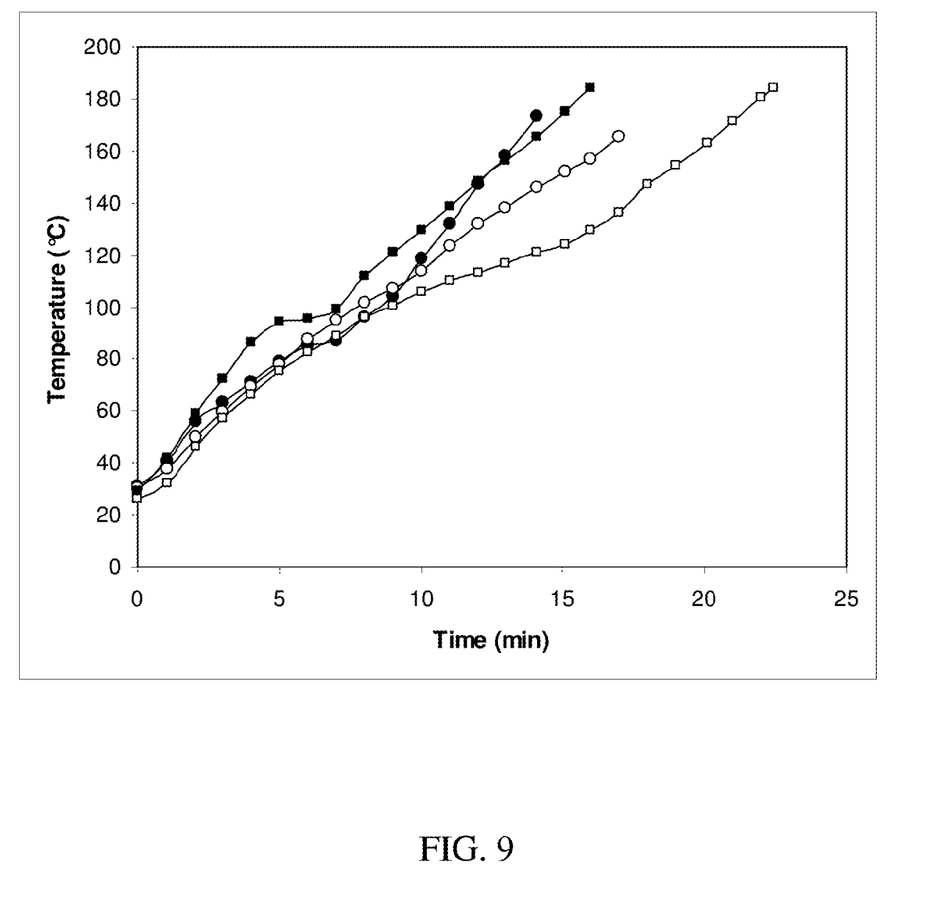
FIG. 9. Burn profiles of samples following a pretreatment of 6 hours of drying at 44° C. The samples included sodium bentonite (SB) gel with starch (□) or without (■), SB foam with starch (○) or without starch (●). The commercial gel profile was similar to that of the SB gel (not included).

A six hour burn test was performed to simulate a scenario where the coatings were exposed to hot, dry conditions prior to the arrival of an approaching fire. The results of the burn test showed that the coatings still suppressed the heating rate of the lap siding substrate but not to the degree of the fresh samples (compare FIGS. 5 and 9). The lag in temperature change near 100° C. was much shorter in the six hour burn test compared to the fresh samples. The drying pretreatment had more of an effect on the gel samples than on the foam materials. This is most likely due to the insulating effect of the foam coatings that protected the substrate. Both the foam and gel samples containing starch had a lower rate of temperature increase compared to the samples without starch (FIG. 9).

CONCLUSIONS

Fire protective gel coating (8 mm) extends the time required for a lap siding substrate to reach critical temperatures (200° C.) by as much as 30 min during burn tests. The coatings are thus effective in cases of emergency in protecting structures from flame fronts typical of most wildfires. Lap siding samples with coatings containing starch have a slower drying rate and longer burn times before reaching critical temperatures compared to samples with coatings containing no starch. Starch is effective in improving the rheological properties of SB gel and foam coatings and reduces slumping. The starch component also forms a continuous boundary layer or crust that shields the substrate from direct heat exposure even after the gel has dried and charred. Accordingly, starch improves the performance of SB coatings and is effective in providing improved fire retardant coatings.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference for all purposes.

What is claimed is:

1. A composition effective as a fire retardant, wherein the composition consists of water, clay and starch,
   wherein
      the clay to starch ratio is between about 10:1 to about 2:1 by weight, and
   wherein
      the water is present in an amount that is between about five (5) times to about twenty (20) times as much water as clay by weight.

2. The composition of claim 1, wherein the clay is sodium bentonite clay.

3. The composition of claim 2 wherein the sodium bentonite clay is present in a 5:2 clay to starch weight ratio.

4. The composition of claim 1, wherein the clay to starch ratio is 5:2 by weight and water is present in an amount that is 10 times as much water as clay by weight.

5. A method for protecting a structure or object from fire or excessive heat, the method comprising:
   applying a fire retardant composition to the structure or object,
   wherein
   the fire retardant composition consists of water, clay and starch, and wherein the clay to starch ratio is between about 10:1 to about 2:1 by weight, and wherein the water is present in an amount that is between about five (5) times to about twenty (20) times as much water as clay by weight.

* * * * *